United States Patent
Mathews

(10) Patent No.: US 7,241,469 B2
(45) Date of Patent: Jul. 10, 2007

(54) FORMULATION AND PROCESS TO PREPARE A PRE-FORMED FILING UNIT

(75) Inventor: Jason Mathews, Gaylord, MN (US)

(73) Assignee: Michael Foods, Inc., Minnetonka, MN (US)

( * ) Notice: Subject to any disclaimer, the term of this patent is extended or adjusted under 35 U.S.C. 154(b) by 148 days.

(21) Appl. No.: 10/161,052

(22) Filed: May 30, 2002

(65) Prior Publication Data

US 2003/0224098 A1 Dec. 4, 2003

(51) Int. Cl.
*A23L 1/32* (2006.01)

(52) U.S. Cl. .................. 426/614; 426/89; 426/100; 426/138; 426/139; 426/284

(58) Field of Classification Search ............. 426/614, 426/89, 100, 138, 139, 284
See application file for complete search history.

(56) References Cited

U.S. PATENT DOCUMENTS

| | | | |
|---|---|---|---|
| 1,756,189 A | 4/1930 | Fousek | |
| 1,900,444 A | 3/1933 | Heuser | |
| 1,929,919 A | 10/1933 | Ekstedt | 107/8 |
| 1,989,359 A | 1/1935 | Heuser | 99/11 |
| 2,000,384 A | 5/1935 | Frantz | 107/54 |
| RE19,898 E | 3/1936 | Fousek | 99/161 |
| 2,093,786 A | 9/1937 | Swarthout | 99/113 |
| 2,159,246 A | 5/1939 | Beyer | 107/54 |
| 2,234,526 A | 3/1941 | Guldbech | 107/54 |
| 2,395,587 A | 2/1946 | Scott et al. | 99/113 |
| 2,463,112 A | 3/1949 | Kipnis | 107/54 |
| 2,504,869 A * | 4/1950 | Noyes | 426/68 |
| 2,565,311 A | 4/1951 | Koonz et al. | 99/161 |
| 2,593,577 A | 4/1952 | Lewis | 99/4 |
| 2,785,075 A * | 3/1957 | Malecki | 426/302 |
| 2,848,334 A | 8/1958 | Jones | 99/113 |
| 2,920,966 A | 1/1960 | Heinemann | 99/113 |
| 2,952,551 A * | 9/1960 | Long et al. | 426/614 |
| 3,009,818 A * | 11/1961 | Jokay et al. | 426/385 |
| 3,027,852 A | 4/1962 | Key | 107/8 |
| 3,038,418 A | 6/1962 | Gugler | 107/8 |
| 3,043,700 A | 7/1962 | Szczesniak | 99/92 |
| 3,073,704 A * | 1/1963 | Rivoche | 426/573 |

(Continued)

FOREIGN PATENT DOCUMENTS

JP 59-26469 * 2/1984

(Continued)

*Primary Examiner*—Anthony Weier
(74) *Attorney, Agent, or Firm*—Fredrikson & Byron, PA

(57) ABSTRACT

The present process relates to a formulation for a food product and preparation of a pre-formed filling unit for the provision of a consumable food product containing eggs, which may be refrigerated and/or frozen for future heating within a microwave oven for consumption by an individual. The process involves the initial step of acquisition of liquid eggs which may be scrambled. The liquid eggs are cooked whereupon the cooked liquid eggs are combined with other ingredients. The temperature of the combined ingredients is regulated and/or controlled during processing. The combined and mixed food product may then be inserted into a mold to provide a desired shape. After cooking the consumable food product may be separated from the mold whereupon the consumable food article may be refrigerated and/or frozen for future reheating as a portion of a breakfast or other consumable food article.

29 Claims, 8 Drawing Sheets

U.S. PATENT DOCUMENTS

| | | | | |
|---|---|---|---|---|
| 3,093,487 A | * | 6/1963 | Jones et al. | 426/614 |
| 3,113,872 A | | 12/1963 | Jones et al. | 99/161 |
| 3,212,906 A | | 10/1965 | Jones | 99/161 |
| 3,260,606 A | | 7/1966 | Azuma | 99/113 |
| 3,293,044 A | | 12/1966 | Torr | 99/113 |
| 3,383,221 A | * | 5/1968 | Chin et al. | 426/614 |
| 3,404,008 A | | 10/1968 | Ballas et al. | 99/161 |
| 3,408,208 A | * | 10/1968 | Lamb | 426/615 |
| 3,409,446 A | | 11/1968 | Van et al. | 99/210 |
| 3,459,560 A | | 8/1969 | Shea | 99/92 |
| 3,468,675 A | * | 9/1969 | Potzl | 426/590 |
| 3,522,777 A | | 8/1970 | Schafer | 107/8 |
| 3,565,638 A | * | 2/1971 | Ziegler et al. | 426/614 |
| 3,640,731 A | | 2/1972 | Kaplow et al. | 99/113 |
| 3,640,732 A | | 2/1972 | Johnson | 99/114 |
| 3,652,397 A | | 3/1972 | Pardun | 195/30 |
| 3,655,405 A | | 4/1972 | Karas et al. | 99/94 |
| 3,662,672 A | | 5/1972 | Hoer | 99/17 |
| 3,697,290 A | | 10/1972 | Lynn | 99/86 |
| 3,864,500 A | | 2/1975 | Lynn | 426/195 |
| 3,889,012 A | | 6/1975 | Riviere et al. | 426/500 |
| 3,920,857 A | | 11/1975 | Barker et al. | 426/307 |
| 3,958,034 A | | 5/1976 | Nath et al. | 426/614 |
| 3,982,040 A | | 9/1976 | Oborn | 426/614 |
| 3,987,212 A | | 10/1976 | Seeley et al. | 426/614 |
| 4,000,323 A | | 12/1976 | Youngquist | 426/93 |
| 4,025,260 A | | 5/1977 | Neel | 425/131.1 |
| 4,034,124 A | | 7/1977 | van Dam | 426/602 |
| 4,068,013 A | | 1/1978 | Brule | 426/565 |
| 4,157,404 A | | 6/1979 | Yano et al. | 426/429 |
| 4,200,663 A | | 4/1980 | Seeley et al. | 426/614 |
| 4,219,585 A | | 8/1980 | Herring | 426/614 |
| 4,234,619 A | | 11/1980 | Yano et al. | 426/614 |
| D272,009 S | | 1/1984 | Zonnenberg | D1/13 |
| 4,428,971 A | | 1/1984 | Havette et al. | 426/565 |
| 4,466,923 A | | 8/1984 | Friedrich | 260/412.4 |
| 4,469,708 A | * | 9/1984 | Rapp et al. | 426/103 |
| 4,478,866 A | | 10/1984 | Ohta et al. | 426/549 |
| 4,493,854 A | | 1/1985 | Friedrich et al. | 426/629 |
| 4,495,207 A | | 1/1985 | Christianson et al. | 426/312 |
| 4,524,082 A | | 6/1985 | Liot | 426/241 |
| 4,524,083 A | | 6/1985 | Liot | 426/330.1 |
| 4,574,690 A | | 3/1986 | Chiao et al. | 99/353 |
| 4,612,197 A | | 9/1986 | Postner | 426/47 |
| 4,618,499 A | | 10/1986 | Wainwright | 426/283 |
| 4,670,285 A | | 6/1987 | Clandinin et al. | 426/602 |
| 4,703,060 A | | 10/1987 | Traitler et al. | 514/549 |
| 4,714,571 A | | 12/1987 | Tremblay et al. | 260/403 |
| D295,225 S | | 4/1988 | Ito | D1/125 |
| 4,746,521 A | | 5/1988 | Niwano et al. | 426/241 |
| 4,776,173 A | | 10/1988 | Kamarei et al. | 62/63 |
| 4,794,009 A | | 12/1988 | Dreisin | 426/283 |
| 4,808,425 A | | 2/1989 | Swartzel et al. | 426/399 |
| 4,814,111 A | | 3/1989 | Kearns et al. | 260/403 |
| 4,844,926 A | | 7/1989 | Hatanaka | 426/282 |
| 4,847,015 A | | 7/1989 | Shigematsu et al. | 260/403 |
| 4,857,329 A | | 8/1989 | Sako et al. | 424/195.1 |
| 4,879,125 A | | 11/1989 | Pak | 426/120 |
| 4,880,573 A | | 11/1989 | Courregelongue et al. | 260/420 |
| 4,880,639 A | | 11/1989 | Lauermann et al. | 426/2 |
| 4,925,637 A | | 5/1990 | Julien et al. | 426/2 |
| 4,957,760 A | | 9/1990 | Swartzel et al. | 426/399 |
| 4,957,768 A | | 9/1990 | Dutilh | 426/604 |
| 4,994,291 A | | 2/1991 | Swartzel et al. | 426/399 |
| 4,997,668 A | | 3/1991 | Johnson et al. | 426/580 |
| 5,024,846 A | | 6/1991 | McLachlan et al. | 426/312 |
| 5,026,565 A | | 6/1991 | McLachlan et al. | 426/241 |
| 5,028,448 A | | 7/1991 | Ros | 426/614 |
| 5,037,661 A | | 8/1991 | Merchant et al. | 426/47 |
| 5,061,505 A | | 10/1991 | Cully et al. | 426/601 |
| 5,063,070 A | | 11/1991 | Klemann et al. | 426/271 |
| 5,064,668 A | | 11/1991 | Klemann et al. | 426/271 |
| 5,073,267 A | | 12/1991 | Adda et al. | 210/634 |
| 5,073,399 A | | 12/1991 | Vassiliou | 426/614 |
| 5,082,674 A | | 1/1992 | Carrell et al. | 426/52 |
| 5,084,215 A | | 1/1992 | Kearns et al. | 260/403 |
| 5,091,117 A | | 2/1992 | Athnasios et al. | 260/428 |
| 5,092,964 A | | 3/1992 | Conte, Jr. et al. | 203/29 |
| 5,097,017 A | | 3/1992 | Konwinski | 530/378 |
| 5,116,628 A | | 5/1992 | Ogasahara et al. | 426/330.1 |
| 5,120,556 A | | 6/1992 | Fujimoto et al. | 426/330.3 |
| 5,120,559 A | | 6/1992 | Rizvi et al. | 426/446 |
| 5,130,155 A | | 7/1992 | Yamate | 426/330 |
| 5,132,288 A | | 7/1992 | Johnson et al. | 514/11 |
| 5,147,672 A | | 9/1992 | McLachlan et al. | 426/241 |
| 5,151,188 A | | 9/1992 | Hopper et al. | 210/634 |
| 5,213,968 A | | 5/1993 | Castle et al. | 435/68.1 |
| 5,238,694 A | | 8/1993 | Ogasahara et al. | 426/330.1 |
| 5,246,717 A | | 9/1993 | Garwin | 426/2 |
| 5,262,190 A | | 11/1993 | Cunningham et al. | 426/549 |
| 5,268,442 A | | 12/1993 | Bradshaw et al. | 528/25 |
| 5,283,072 A | | 2/1994 | Cox et al. | 426/312 |
| 5,287,632 A | | 2/1994 | Heit et al. | 34/9 |
| 5,288,619 A | | 2/1994 | Brown et al. | 435/134 |
| 5,290,583 A | | 3/1994 | Reznik et al. | 426/614 |
| 5,302,405 A | | 4/1994 | Hsieh et al. | 426/271 |
| 5,304,546 A | | 4/1994 | Comini et al. | 552/545 |
| 5,378,487 A | | 1/1995 | Merchant et al. | 426/580 |
| 5,399,369 A | | 3/1995 | Singer | 426/417 |
| 5,403,898 A | | 4/1995 | Bradshaw et al. | 525/474 |
| 5,470,377 A | | 11/1995 | Whitlock | 95/90 |
| 5,478,585 A | | 12/1995 | Isono et al. | 426/417 |
| 5,487,911 A | | 1/1996 | Ueda et al. | 426/614 |
| 5,514,401 A | | 5/1996 | Zeidler et al. | 426/429 |
| 5,552,173 A | | 9/1996 | Singh et al. | 426/417 |
| 5,584,989 A | | 12/1996 | Jameson | 210/137 |
| 5,589,211 A | | 12/1996 | Cox et al. | 426/298 |
| 5,599,381 A | | 2/1997 | Whitlock | 95/90 |
| 5,601,707 A | | 2/1997 | Clay et al. | 210/198.2 |
| 5,614,244 A | * | 3/1997 | Heick et al. | 426/582 |
| 5,616,352 A | | 4/1997 | Heidlas et al. | 426/312 |
| 5,620,735 A | | 4/1997 | Manderfeld et al. | 426/614 |
| 5,647,976 A | | 7/1997 | Rothe et al. | 210/137 |
| 5,653,885 A | | 8/1997 | Jameson et al. | 210/634 |
| 5,656,319 A | | 8/1997 | Barclay | 426/574 |
| 5,665,416 A | | 9/1997 | Manderfeld et al. | 426/614 |
| 5,670,614 A | | 9/1997 | Roby et al. | 528/480 |
| 5,676,737 A | | 10/1997 | Whitlock | 95/90 |
| 5,690,828 A | | 11/1997 | Clay et al. | 210/634 |
| 5,718,937 A | | 2/1998 | Heidlas et al. | 426/533 |
| D391,737 S | | 3/1998 | Wright | D1/125 |
| 5,738,498 A | | 4/1998 | Allington et al. | 417/53 |
| 5,750,679 A | | 5/1998 | Haas et al. | 536/127 |
| 5,755,559 A | | 5/1998 | Allington et al. | 417/53 |
| 5,759,549 A | | 6/1998 | Hiltunen et al. | 424/195.1 |
| 5,780,095 A | | 7/1998 | Jackeschky | 426/614 |
| 5,783,243 A | | 7/1998 | Benado | 426/425 |
| 5,843,311 A | | 12/1998 | Richter et al. | 210/634 |
| 5,880,300 A | | 3/1999 | Kodali | 554/190 |
| 5,882,565 A | | 3/1999 | Wood et al. | 264/209.5 |
| 5,932,276 A | | 8/1999 | Bhatia et al. | 426/614 |
| 6,235,330 B1 | * | 5/2001 | Scherpf et al. | 426/302 |
| 6,391,371 B1 | * | 5/2002 | Bhatia et al. | 426/614 |
| 6,676,986 B1 | * | 1/2004 | Huttenbauer, Jr. | 426/646 |
| 2003/0185944 A1 | * | 10/2003 | Zelski | 426/120 |

FOREIGN PATENT DOCUMENTS

| JP | 62-262998 | | 11/1987 |
| JP | 410313826 | * | 12/1998 |

* cited by examiner

FORMULATION AND PROCESS TO PREPARE A PRE-FORMED FILING UNIT

BACKGROUND OF THE INVENTION

The present invention is directed to a formulation and process to prepare a pre-cooked, pre-formed filling unit for a consumable food product preferably including eggs as a principal component. It is anticipated that the consumable food product will be refrigerated and/or frozen for future heating within a microwave oven, convection oven or griddle for consumption as a portion of a food article. The consumable food product may be used as an ingredient within a food product such as a breakfast burrito, wraps, stuffed potatoes, and frittatas.

The pre-cooked, pre-formed filling unit reduces labor required by quick serve restaurants, and most other food service providers to prepare burrito's and other similar foods containing scrambled eggs, cheese, sausage, ham, vegetables and other similar ingredients.

In the past, consumable food has been formed by the filling of a mold with a liquid egg mixture and cooking the liquid egg within the mold. Alternatively, a liquid egg mixture may be pumped onto a flat cooking belt for cooking within an oven. Consumable food articles formed of eggs which have been produced according to the above identified methods unfortunately have the appearance and taste of commercial processing. Frequently these food articles after cooking are extremely dense and have the appearance of a cheese product. Consumable food articles including eggs formed through the use of a mold and/or cooking through use of a flat cooking belt frequently have undesirable sensory perceptions related to taste, texture, and taste differentiation between components included within the food article. A need therefore exists to eliminate the dense commercial processing appearance for consumable food articles including eggs which have been formed within a mold or upon a flat cooking belt and as cooked within an oven without rigorous control of processing and cooking parameters. A need also exists to form a consumable food article which is more appealing in appearance for use within a breakfast food product heated in a microwave oven for consumption by an individual.

Generally, it has been difficult to initially incorporate independent flavors into a food item to be refrigerated and/or frozen for future unthawing and heating at a desired time for consumption by an individual. Freezing and/or extended refrigeration of combined ingredients having distinct flavors exhibit the tendency for the flavors to blend into a composite taste. In the past, the individual components of the composite food product have not retained an individual taste. In addition, the freezing and/or extended refrigeration of a composite food article frequently leads to loss of texture, loss of cohesive texture, and the degradation of other sensory perceptions such as mouth feel, rubberiness, and/or the food product not being tender or appealing to an individual.

In the past, in order to obtain a desired homemade perception with respect to texture, taste, and other sensory perceptions, a food item was required to be consumed within a short period of time following cooking where no freezing and/or refrigeration of the food product has occurred. No techniques were known to extend the life and/or shelf life of the cooked food product under known refrigeration and/or freezing techniques.

Another common problem encountered during delayed consumption, extended refrigeration and/or freezing of a food product containing eggs following cooking, is that syneresis occurs which is the loss of water when frozen and reheated, or when stored for an extended period of time.

In the past, it has also been difficult to control proportions of individual ingredients for a food product to establish a uniform consumable food item. For example, a slight increase in the volume of onions may cause a significant variation in the taste for the composite food product. It is desirable to provide standardized consumable food products, having minimal taste variation between individual portions.

In the past, temperature variations of ingredients during processing have caused degradation in the sensory perceptions associated with the composite food article. Further, the over mixing of individual ingredients may also cause the degradation in the texture, mouth feel, and taste for the composite food article.

BRIEF DESCRIPTION OF THE INVENTION

The present process relates to a formulation for a food product and preparation of pre-cooked, pre-formed filling units for the provision of a consumable food product containing eggs, which may be refrigerated and/or frozen for future heating within a microwave, conventional oven, convection oven, griddle, pressureless steamer, or steamtable for consumption by an individual. The process involves the initial step of acquisition of liquid eggs which are then combined with other ingredients and scrambled through various methods known. The pre-cooked scrambled eggs are then mixed with other ingredients and then augured/deposited into a mold to provide a desired shape and weight. Following formation the fully cooked consumable food product may be separated from the mold whereupon the consumable food article may be refrigerated and/or frozen for future reheating as a portion of a breakfast or other consumable food article.

A principle advantage of the present invention is to create a consumable food article having improved texture.

Another principle advantage of the present invention is to create a consumable food article containing eggs which includes a homemade appearance for the eggs.

Still another principle advantage of the present invention is to reduce preparation time, labor and costs for quick service restaurants and other food service providers.

Still another principle advantage of the present invention is to reduce the safety exposure to the food service institutions by preparing a pre-cooked item.

Still another principle advantage of the present invention is to create a consumable food article including eggs which may be formed through the use of commercially available equipment.

Still another principle advantage of the present invention is to create a consumable food article including eggs which has a light and airy texture resembling scrambled eggs.

Still another principle advantage of the present invention is to create a consumable food article including eggs which has a more appetizing appearance.

Still another principle advantage of the present invention is to provide an improved consumable food article having eggs formed from relatively simple and inexpensive ingredients and processing equipment which fulfills the intended purpose of enhancing the appeal and appearance of a consumable food article without fear of damage to the food article and/or food processing equipment and/or illness to individuals.

Still another principle advantage of the present invention is the addition of gums and starches to improve the appeal of the food article.

Still another principle advantage of the present invention is the use of FDA approved ingredients for formulation of a consumable food article.

Still another principle advantage of the present invention is the provision of a formulation process which improves the quality of a consumable food article through the control of formula conditions.

Still another principle advantage of the present invention is the provision of an enhanced consumable food article which is processed through traditional egg and food processing equipment where the processing conditions have been controlled and regulated.

Still another principle advantage of the present invention is the use of a pre-formed filling unit to provide an improved consumable food article.

Still another principle advantage of the present invention is the efficient control of mixing parameters to formulate a desired quality of consumable food article.

Still another principle advantage of the present invention is the provision of a consumable food article which resembles the homemade quality of freshly cooked food articles where the consumable food article of the present invention is reheated for consumption by an individual after freezing and/or extended refrigeration.

Still another principle advantage of the present invention is the provision of a consumable food article which may be held as frozen, refrigerated, and/or hot for extended periods of time without loss of product integrity to minimize waste.

Still another principle advantage of the present invention is the provision of a consumable food article including eggs and other ingredients which has been processed over a specific duration of time.

Still another principle advantage of the present invention is the provision of a superior consumable food article, which includes integrity characteristics not found in other food articles within the same product classification.

Still another principle advantage of the present invention is the provision of a consumable food article having enhanced product consistency, which is not found in other food articles within the same product classification.

Still another principle advantage of the present invention is the provision of a consumable food article, which remains intact following refrigeration and/or freezing and subsequent reheating for incorporation into a food article.

Still another principle advantage of the present invention is the provision of a consumable food article having improved texture and flavor as related to other food articles within the same product classification.

Still another principle advantage of the present invention is the provision of a consumable food article having improved flavor differentiation while simultaneously resisting flavor integration as related to other food articles within the same product classification.

Still another principle advantage of the present invention is the provision of a consumable food article which minimizes syneresis of the egg product during processing, cooling, refrigeration, and/or freezing and subsequent storage for further reheating prior to consumption by an individual.

BRIEF DESCRIPTION OF THE SEVERAL VIEWS OF THE DRAWING(S)

DETAILED DESCRIPTION OF THE INVENTION

Figure 1:
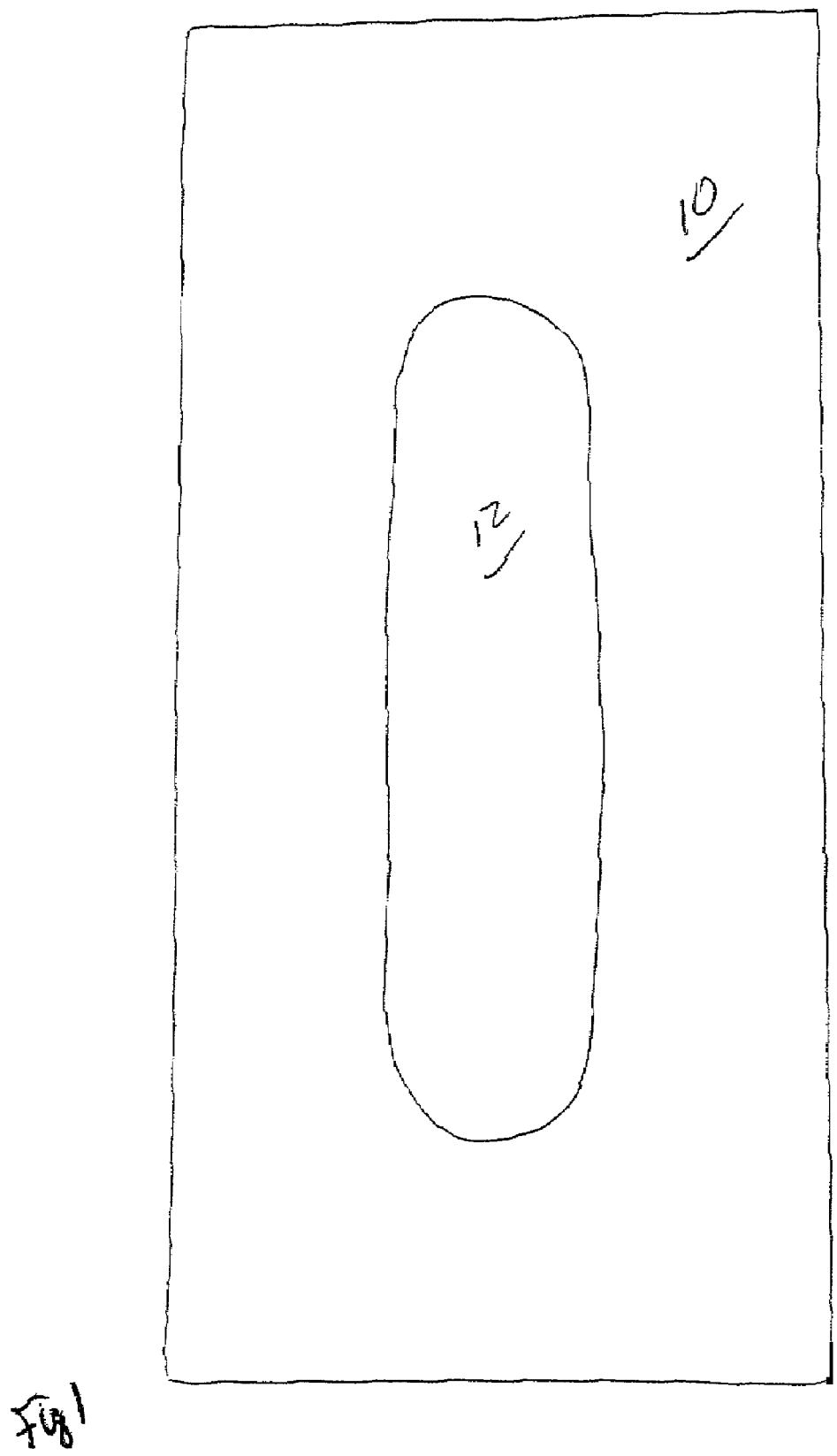
FIG. 1 is a top view of a mold at the bench level.

In general, the disclosed invention relates to a formulation for a consumable food article containing pre-cooked scrambled eggs, and a process to prepare the consumable food article utilizing a pre-formed mold. The consumable food article may include many different types of ingredients and especially eggs. The consumable food article may be served individually and/or incorporated into composite consumable food products such as breakfast burritos, wraps, stuffed potatoes, and/or frittatas.

The disclosed formulation for the consumable food article, and process to prepare the consumable food article, originates with liquid eggs mixed with other ingredients which are cooked then scrambled and chilled or frozen. The scrambled eggs are then mixed with additional ingredients and then formed for refrigeration or freezing. Reheating may occur within microwave ovens, convection ovens, griddles or any other type of heating device without limitation, for consumption by an individual. The food article may include a wide range of egg products and ingredient formulations, which when mixed, frozen and/or refrigerated, followed by reheating result in a visually and sensory appealing food article which is readily distinguishable from other food articles within the same classification.

The process for forming a consumable food article for future reheating within a microwave or other heating oven or griddle is distinctly different in certain physical characteristics as related to standard processing techniques.

The failure to control ingredient proportions, regulate the temperature of the ingredients, and/or the management of mixing parameters significantly degrades the integrity of sensory and taste perceptions for the food article. Control of ingredient proportions, regulation of the temperature for the ingredients, and management of mixing parameters for the ingredients provides enhanced consistency and integrity for the consumable food article. The texture, flavor, and flavor differentiation for the food article is thereby improved while simultaneously deterring flavor integration into a homogeneous mixed flavor. Regulation of the temperature and management of mixing parameters also reduces syneresis, and enhances the likelihood that the food article will remain intact through processing, freezing or refrigeration, and subsequent reheating prior to consumption by an individual.

During food processing, where a combination of ingredients are utilized, the refrigeration and/or freezing of the mixed food article for future consumption generally results in a tendency for the flavors to blend into a composite taste. Generally, in the types of food articles described herein, the blending of flavors is not desired, and preferably the food processing techniques described herein maximize taste differentiation between individual ingredients within a composite consumable food article.

In addition, the present invention through control of ingredient proportions, regulation of ingredient temperature and management of mixing parameters maximizes the retention of a cohesive texture and sensory perceptions associated with a composite consumable food article. The formulations and food processing techniques described herein minimize undesirable effects of the food becoming rubbery, the food item exhibiting syneresis or loss of water when frozen, reheated, or when stored for an extended duration of time. The formulations and food process techniques described herein further minimize waste of the consumable composite food article or individual components which comprise the composite consumable food article.

The formulation for the consumable food article utilizes various ingredients to provide a desired combination of individual flavors for use in a food product. Generally, the ingredients to be incorporated into the consumable food article are precooked, pre-processed, and/or individually quick frozen to minimize undesirable health issues and to maximize ingredient taste and other sensory perceptions. In general, vegetables such as broccoli, celery, onion, red peppers, green peppers, and/or chilies may be utilized within the consumable food article. The vegetables described herein have been provided for illustrative purposes only and the group of vegetables identified herein may comprise any number of additional vegetables which have not previously been identified. Generally, the vegetables as identified herein are blanched and/or scalded prior to freezing. The blanched and/or processed vegetables are then individually quick frozen and are therefore in a condition for immediate thawing, reheating, and/or are in a condition to be served to an individual for consumption.

The consumable food article also preferably includes any variety of meats including, but not necessarily limited to, ham, sausage, and/or bacon. The meats as utilized herein are preferably pasteurized, pre-cooked, pre-processed, and are considered ready to eat. The meats as described herein are also preferably individually quick frozen for immediate thawing and/or reheating prior to being served to an individual.

The eggs described herein are formulated with numerous ingredients then pre-cooked and individually quick-frozen. The eggs described herein may have numerous curd sizes depending on specific desired end product. The eggs described herein may be cooked using numerous methods which include and are not necessarily limited to: a continuous belt grill, continuous tube and tube, and continuous mold ovens. The eggs described herein are then used as a significant component of the consumable food article.

The composite consumable food article as described herein may be utilized with potatoes, potato shells, potato halves, and/or wraps such as soft tortilla shells for inclusion within a composite consumable food product. The consumable food article described herein may also include a variety of cheeses including but not necessarily limited to American cheese, Pepper Jack cheese, Cheddar cheese, as well as spices such as salt, white pepper, chili flavor, spice blend, burrito spice mix, garlic powder, onion powder, and/or liquid pepper extract. Further, the consumable food article described herein may include one or a variety of starches, one of a variety of gums and preferably xanthan gum, and non-fat dry milk and whey solids. Further, the consumable food article may include water, soybean oil, corn oil, citric acid, and/or butter flavor.

It is generally desirable to individually quick freeze the finished food article as quickly as possible. Freezing parameters will depend on the specific weight of pre-formed filling unit. Maximum time allowed for completely freezing the pre-formed filling unit should not exceed 30 minutes. Generally as the time required for freezing decreases the quality of the frozen article after thawing increases.

A Spiral freezer is one of the current existing methods to be used to individually quick-freeze ingredients and/or the pre-formed-filled consumable food article. The through put for the freezer may establish a freezing time of approximately 30 minutes or less.

Following the completion of processing, the food article may be shaped and individually quick frozen where the food item may endure being frozen, refrigerated, and/or being kept hot following reheating for an extended durations of time without the sacrifice of product quality.

In general, the consumable food article is formed using pre-cooked scrambled eggs with multi-formulations where the eggs are provided in the percentage amount between 40% and 91% as compared to the total percent weight for the entire consumable food article. Water is generally provided in an amount between 2% and 26% of the total weight of the consumable food article. Soy bean oil and/or corn oil is usually provided between 0% and 6% as based upon the percentage of total weight for the consumable food article. Modified food starch is generally provided between 0% to 3% of the total weight of the consumable food article. Non-fat dried milk is generally provided between 0% to 3% of the total weight of the consumable food article. Salt is generally provided between 0% to 0.75% of the total weight of the consumable food article. Xanthan gum is generally provided between 0% to 0.4% of the total weight of the consumable food article. Liquid pepper extract is generally provided between 0% to 0.3% of the total weight of the consumable food article. Citric acid is generally provided between 0% to 0.2% of the total weight of the consumable food article. Butter flavor is generally provided between 0% to 0.2% of the total weight of the consumable food article. Whey solids are generally provided between 0% to 3% of the total weight of the consumable food article. Natural egg flavors generally provided between 0% to 0.65% of the total weight of the consumable food article. Ham is generally between 0% to 20% of the total weight of the consumable food article. Onions are generally provided between 0% to 10% of the total weight of the consumable food article. Green peppers are generally provided between 0% to 6% of the total weight of the consumable food article. Red peppers are generally provided between 0% to 6% of the total weight of the consumable food article. Spice blend is generally provided between 0% to 3% of the total weight of the consumable food article. American cheese is generally provided between 0% to 5% of the total weight of the consumable food article. Pepper Jack cheese is generally provided between 0% to 5% of the total weight of the consumable food article. Cheddar cheese is generally provided between 0% to 25% of the total weight of the consumable food article. Green chilies are generally provided between 0% to 0.3% of the total weight of the consumable food article. White pepper is generally provided between 0% to 0.3% of the total weight of the consumable food article. Chili flavor is generally provided between 0% to 0.05% of the total weight of the consumable food article. Sausage is generally provided between 0% to 30% of the total weight of the consumable food article. Finally, burrito spice is generally provided between 0% to 3% of the total weight of the consumable food article.

One formula for the scrambled egg product utilized within the consumable food article would involve the use of whole egg constituting 62.46% of the total weight of the egg product; water comprising 25.235% of the total weight of the egg product; soybean oil/corn oil constituting 5.75% of the total weight of the egg product; modified food starch being 2.88% of the total weight of the egg product; dairy blend constituting 2.719% (non-fat dry milk at 25% and whey solids at 75%) of the total weight of the egg product; salt in the amount 0.604% of the total weight of the egg product; xanthan gum in the amount of 0.141% of the total weight of the egg product; natural egg flavor in an amount of 0.060% of the total weight of the egg product; liquid pepper extract in the amount of 0.060% of the total weight of the egg product; citric acid in the amount of 0.081% of the total weight of the egg product; and natural butter flavor in the amount of 0.008% of the total weight of the egg product.

An alternative formula for the scrambled egg product utilized within the consumable food article would include whole egg being 90.53% of the total weight of the egg product; water being 5.9% of the total weight of the egg product; soy bean oil being 1% of the total weight of the egg product; modified food starch being 0.8% of the total weight of the egg product; non-fat dried milk being 0.66% of the total weight of the egg product; salt being 0.4% of the total weight of the egg product; xanthan gum being 0.3% of the total weight of the egg product; liquid pepper extract being 0.2% of the total weight of the egg product; citric acid being 0.11% of the total weight of the egg product; and butter flavor being 0.1% of the total weight of the egg product.

One formula for the consumable food article for a western style egg log would include pre-cooked individually quick frozen scrambled eggs in the amount of 71% of the total weight of the consumable food article; ham in the amount of 7.25% of the total weight of the consumable food article; individually quick frozen onions in the amount of 7.25% of the total weight of the consumable food article; individually quick frozen green peppers in the amount of 5% of the total weight of the consumable food article; modified food starch in the amount of 2.5% of the total weight of the consumable food article; and spice blend in the amount of 2% of the total weight of the consumable food article. STOPPED HERE Still another formula for the consumable food article for a breakfast burrito filling would include the use of individually quick frozen cooked scrambled eggs in the amount of 58% of the total weight of the consumable food article; cooked ham in the amount of 15.2% of the total weight of the consumable food article; American cheese in the amount of 4% of the total weight of the consumable food article; Pepper Jack cheese in the amount of 4% of the total weight of the consumable food article; Cheddar cheese in the amount of 4% of the total weight of the consumable food article; individually quick frozen onions in the amount of 3% of the total weight of the consumable food article; individually quick frozen green chilies in the amount of 2% of the total weight of the consumable food article; water in the amount of 3% of the total weight of the consumable food article; individually quick frozen green peppers in the amount of 2% of the total weight of the consumable food article; individually quick frozen red peppers in the amount of 2% of the total weight of the consumable food article; modified food starch in the amount of 2% of the total weight of the consumable food article; salt in the amount of 0.5% of the total weight of the consumable food article; white pepper in the amount of 0.25% of the total weight of the consumable food article; and chili flavor in the amount of 0.02% of the total weight of the consumable food article.

In another alternative formula for the consumable food article for a breakfast burrito filling would include the use of the individually quick frozen cooked scrambled eggs which would constitute 52.03% of the total weight of the consumable food article; pre-cooked and individually quick frozen sausage would form 21.2% of the total weight of the consumable food article; American cheese would form 4% of the total weight of the consumable food article; Pepper Jack cheese would form 4% of the total weight of the consumable food article; Cheddar cheese would form 4% of the total weight of the consumable food article; individually quick frozen onions would form 3% of the total weight of the consumable food article; water would form 3% of the total weight of the consumable food article; individually quick frozen green chilies would form 2% of the total weight of the consumable food article; individually quick frozen green peppers would form 2% of the total weight of the consumable food article; individually quick frozen red pepper would form 2% of the total weight of the consumable food article; modified food starch would form 2% of the total weight of the consumable food article; salt would form 0.5% of the total weight of the consumable food article; white pepper would form 0.25% of the total weight of consumable food article; and chili flavor would form 0.02% of the total weight of the consumable food article.

In another alternative formula for the consumable food article for a breakfast burrito filling, the individually quick frozen scrambled eggs would constitute 41% of the total weight of the consumable food article; pre-cooked and individually quick frozen sausage crumbles would constitute 28.75% of the total weight of the consumable food article; Cheddar cheese would constitute 19% of the total weight of the consumable food article; individually quick frozen green peppers would constitute 4% of the total weight of the consumable food article; individually quick frozen red pepper would constitute 4% of the total weight of the consumable food article; modified food starch would constitute 2% of the total weight of the consumable food article; and burrito spice mix would constitute 1.25% of the total weight of the consumable food article.

In yet another consumable food article identified as a cheesy egg tartar, potato shells would constitute 55.69% of the total weight of the consumable food article; scrambled egg curds would constitute 28.1% of the total weight of the consumable food article; Cheddar cheese would constitute 10.07% of the total weight of the consumable food article; water would constitute 2.75% of the total weight of the consumable food article; and modified food starch would constitute 0.68% of the total weight of the consumable food article.

In an alternative formula for the consumable food article for a western style egg log, individually quick frozen cooked scrambled eggs would constitute 71% of the total weight of the consumable food article; pasteurized ham would constitute 7.25% of the total weight of the consumable food article; individually quick frozen onions would constitute 7.25% of the total weight of the consumable food article; individually quick frozen green peppers would constitute 5% of the total weight of the consumable food article; individually quick frozen red peppers would constitute 5% of the total weight of the consumable food article; modified food starch would constitute 2.5% of the total weight of the consumable food article; and spice pack blend would constitute 2% of the total weight of the consumable food article.

The temperature of each separate ingredient is regulated prior to, and at the time of mixing of the combined ingredients. In addition, the duration of the mixing time for the combined ingredients is restricted to avoid over mixing. The variance in the temperature of the mixed ingredients and/or a variation in the duration of mixing fails to provide a desired quality of end product.

Following combination of ingredients and mixing according to the parameters identified herein, the combined consumable food product may be transferred to a dispensing device which may include a hopper for placement of the combined consumable food product into preformed filling units. The pre-formed filling units are molds having one more openings adapted to receive the consumable food product.

The ingredients of the consumable food product are preferably mixed within a Krämer & Grebe multi-mix mixer. Alternatively, the ingredients may be mixed within a Hobart blender. The mixed consumable food product is preferably placed within individual molds by a Koppens machine, which may include the hopper and a press to compress a desired amount of the mixed consumable food article within each individual mold slot. A conveyor and/or an extractor device preferably inserts an empty mold and retrieves a filled mold from the Koppens dispenser for delivery to a product separation device. The product separation device preferably includes a plunger, which causes the partition and/or detachment of the molded consumable food product from the mold and onto a conveyor. The conveyor preferably transports individual molded consumable food products to a package stage where one or more of the individual molded consumable food product may be packaged and subsequently frozen, individually quick frozen, refrigerated, and/or heated for future consumption by an individual. Alternatively, the freezing, and/or individual quick-freezing may occur prior to packaging. The individually molded consumable food product may be consumed as a stand alone item and/or may be incorporated into a composite food article such as breakfast burritos, wraps, stuffed potatoes, and/or frittatas.

FIG. 1, depicts a bench mold which may be made of polypropylene, polyethylene, Teflon®, and/or any other desired material for use in the processing of consumable food items. The material selected for the mold 10, is required to be amenable to repeated cleansing to minimize food related health issues and/or contamination. The mold itself may have numerous sizes and shapes depending on the desired finished product.

Figure 2:
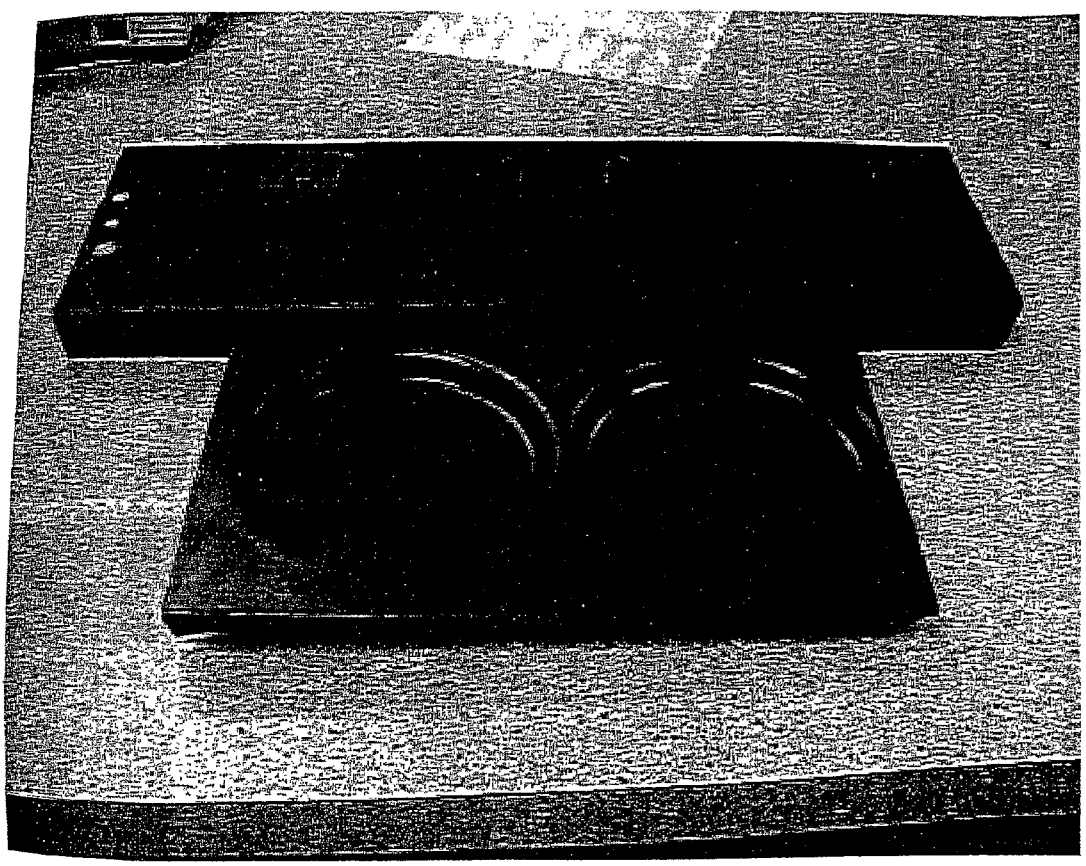
FIG. 2 is an alternative isometric view of a mold.
Figure 3:
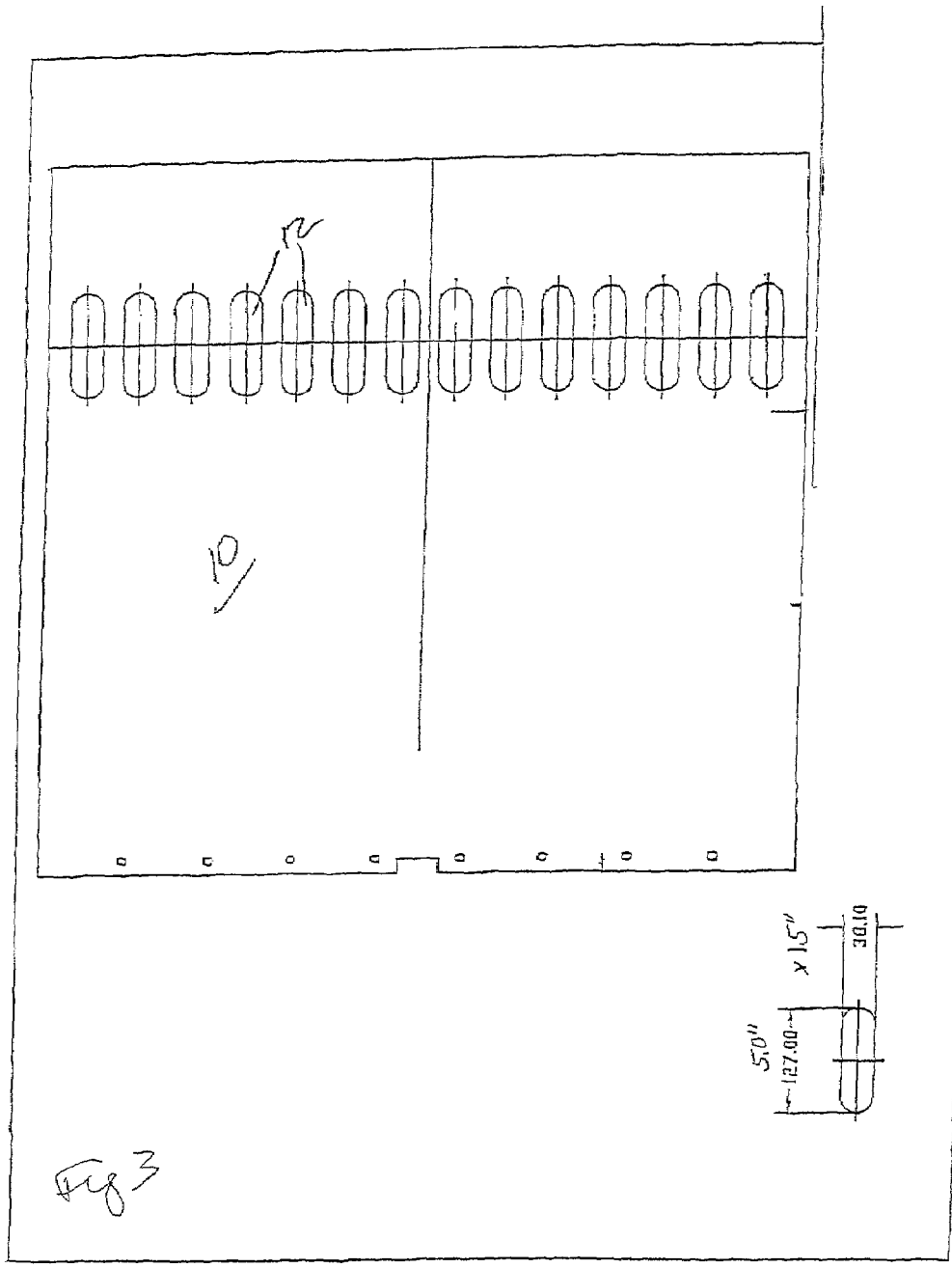
FIG. 3 is an alternative top view of a mold plate used in the Koppens machine.
Figure 4:
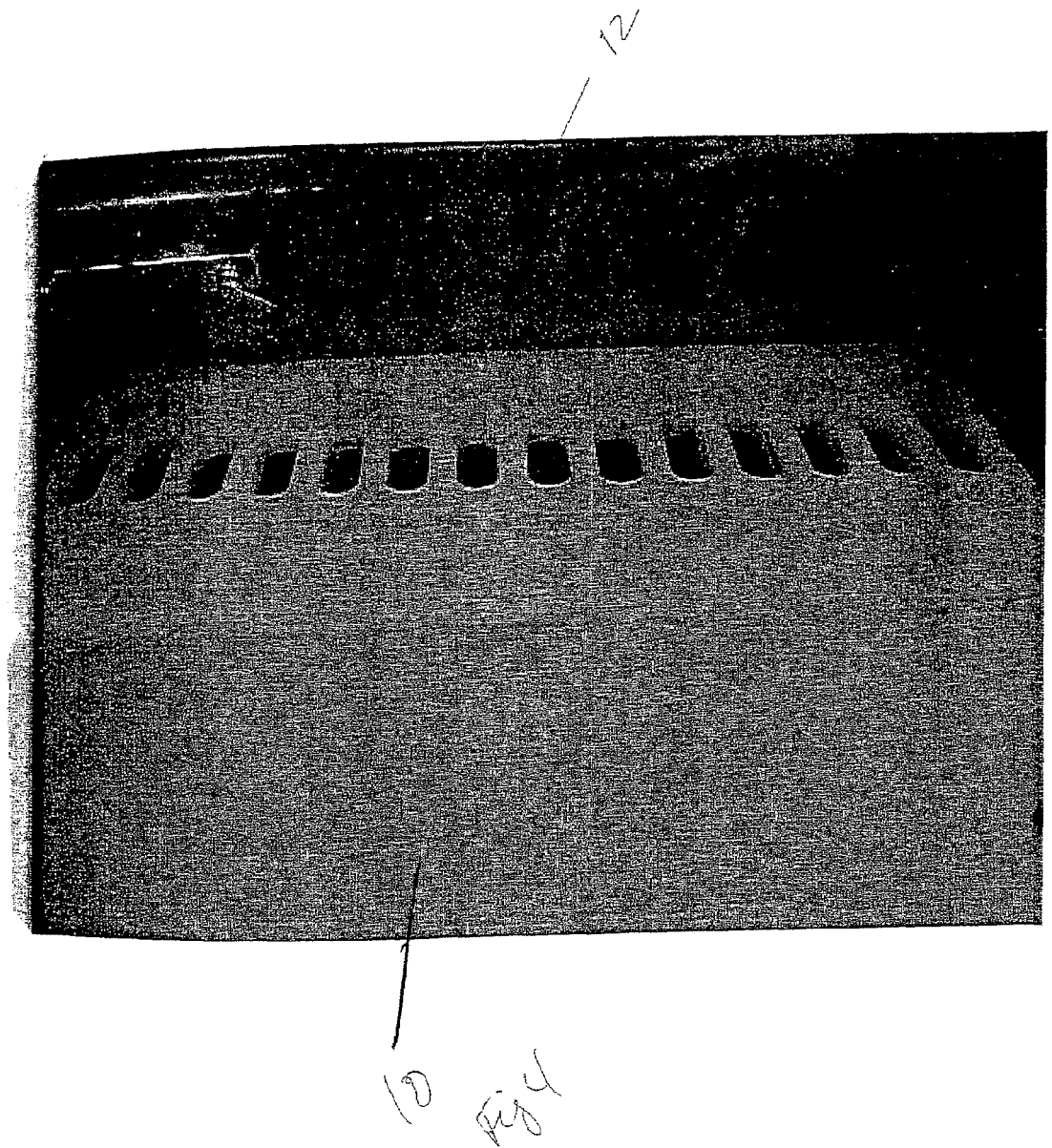
FIG. 4 is an alternative isometric view of a mold plate used in the Koppens machine.

The mold 10, preferably includes a plurality of regularly spaced food receiving openings 12. The food receiving openings 12 are generally aligned in a regularly spaced and parallel orientation where each opening 12 has an approximate shape of a rectangle having rounded ends. Each of individual mold openings 12 are generally adapted to receive 3 ounces or 85.05 grams of mixed consumable food product for transformation into a pre-formed egg log or other desired food product. Each individual mold has an approximate length dimension of 5 inches to 6.25 inches and/or 127 millimeters to 158.75 millimeters and has a width dimension of approximately 1.5 inches or 38.1 millimeters. Each mold 10 may include a single and/or plurality of individual food receiving openings 12. Alternatively, the mold 10 may include a substantially rectangular shaped food defining area and/or circular food defining area as depicted in FIGS. 2 and 3.

Figure 5:
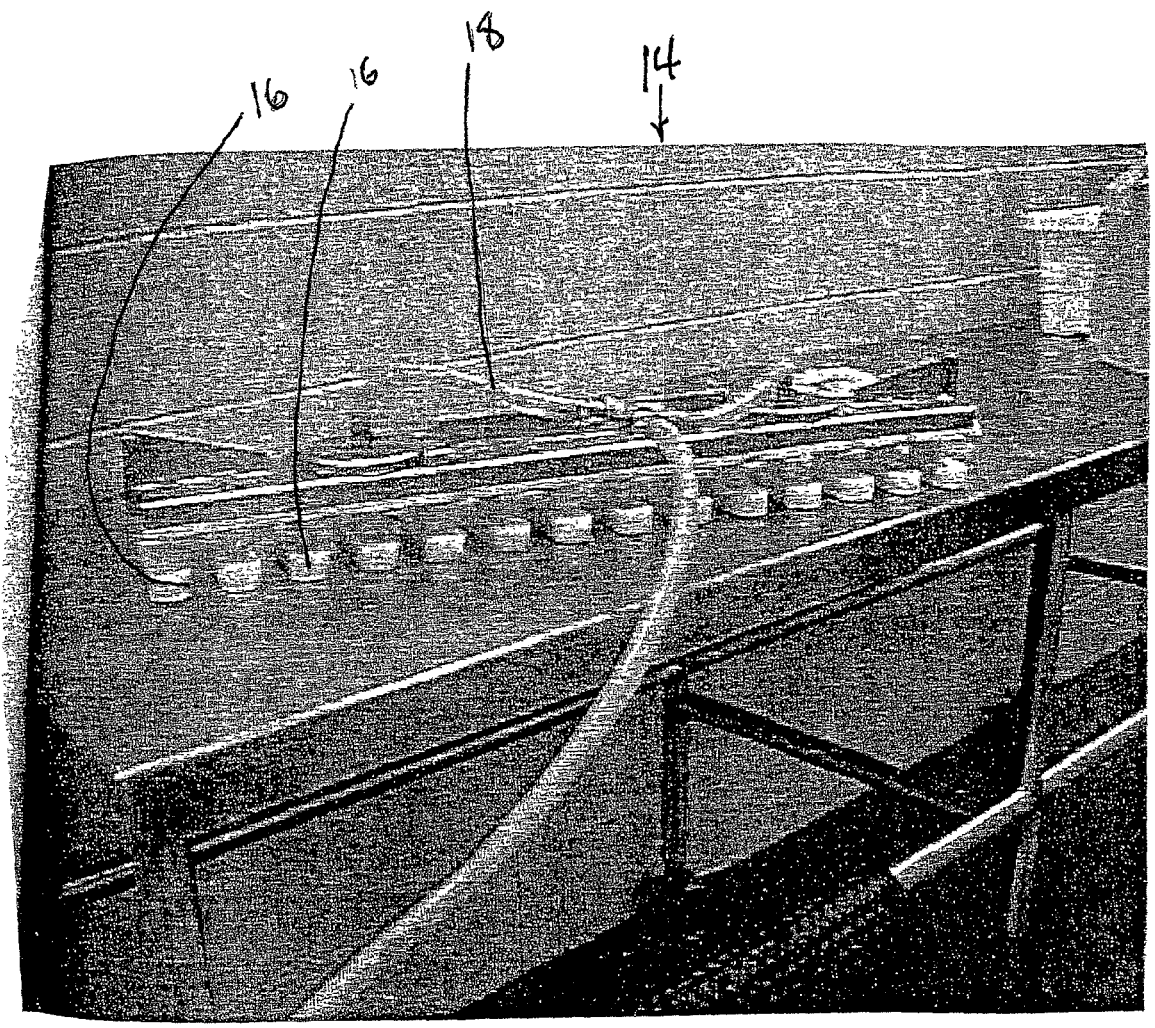
FIG. 5 is a detailed isometric view of a separation device used to push the product out of the mold plate.
Figure 6:
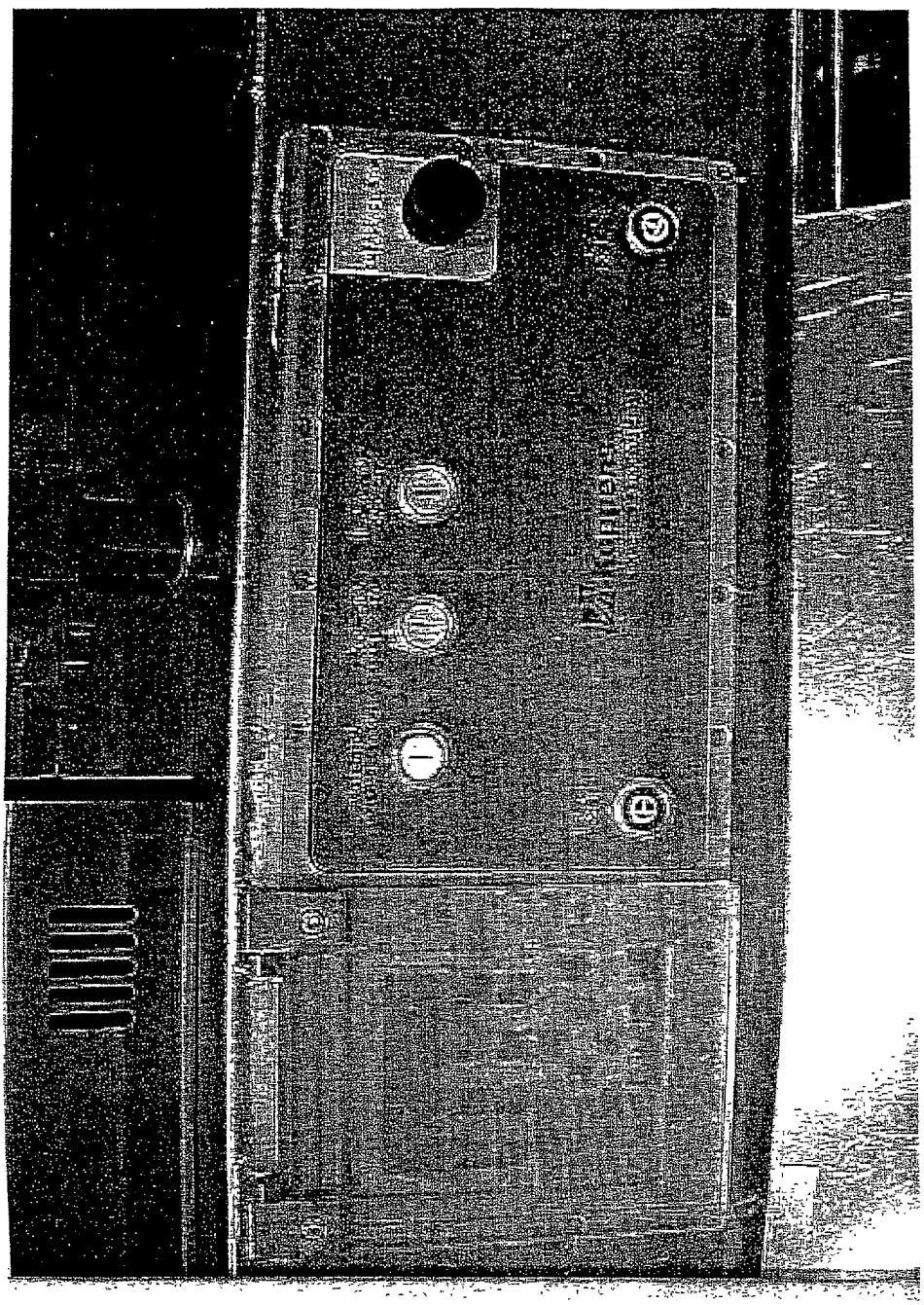
FIG. 6 is a front view of the control panel of the dispensing machine which holds the mold plate and the separation device as well as the product being formed.
Figure 7:
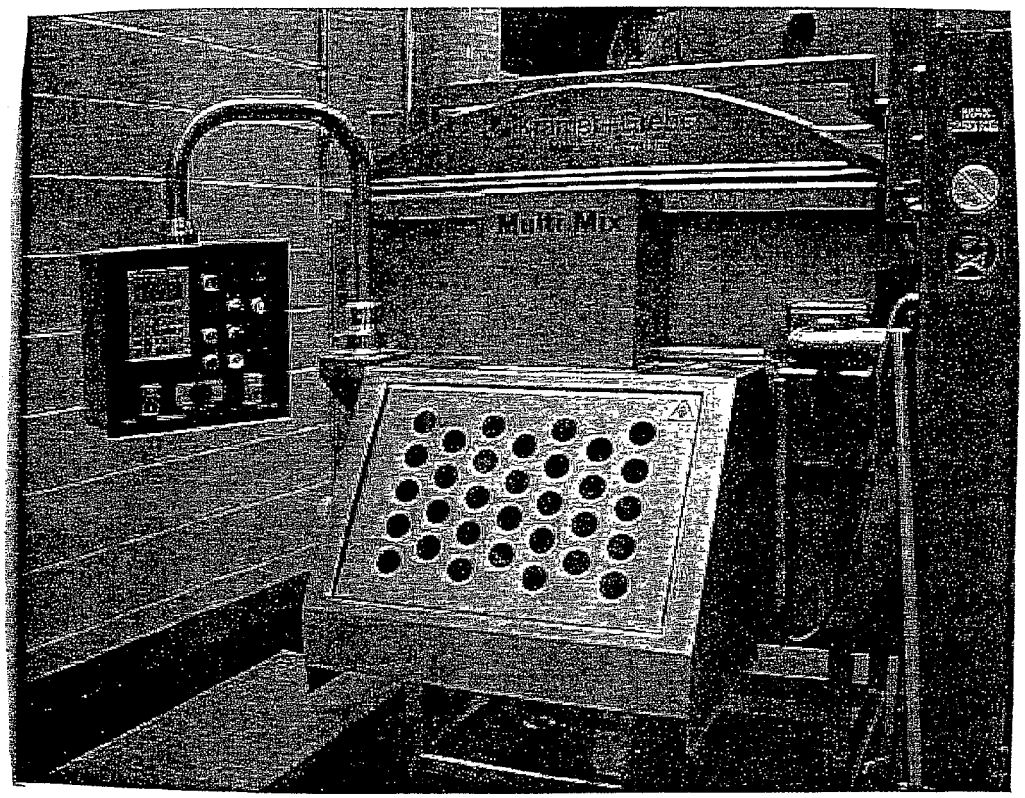
FIG. 7 is an environmental view of a mixing machine.
Figure 8:
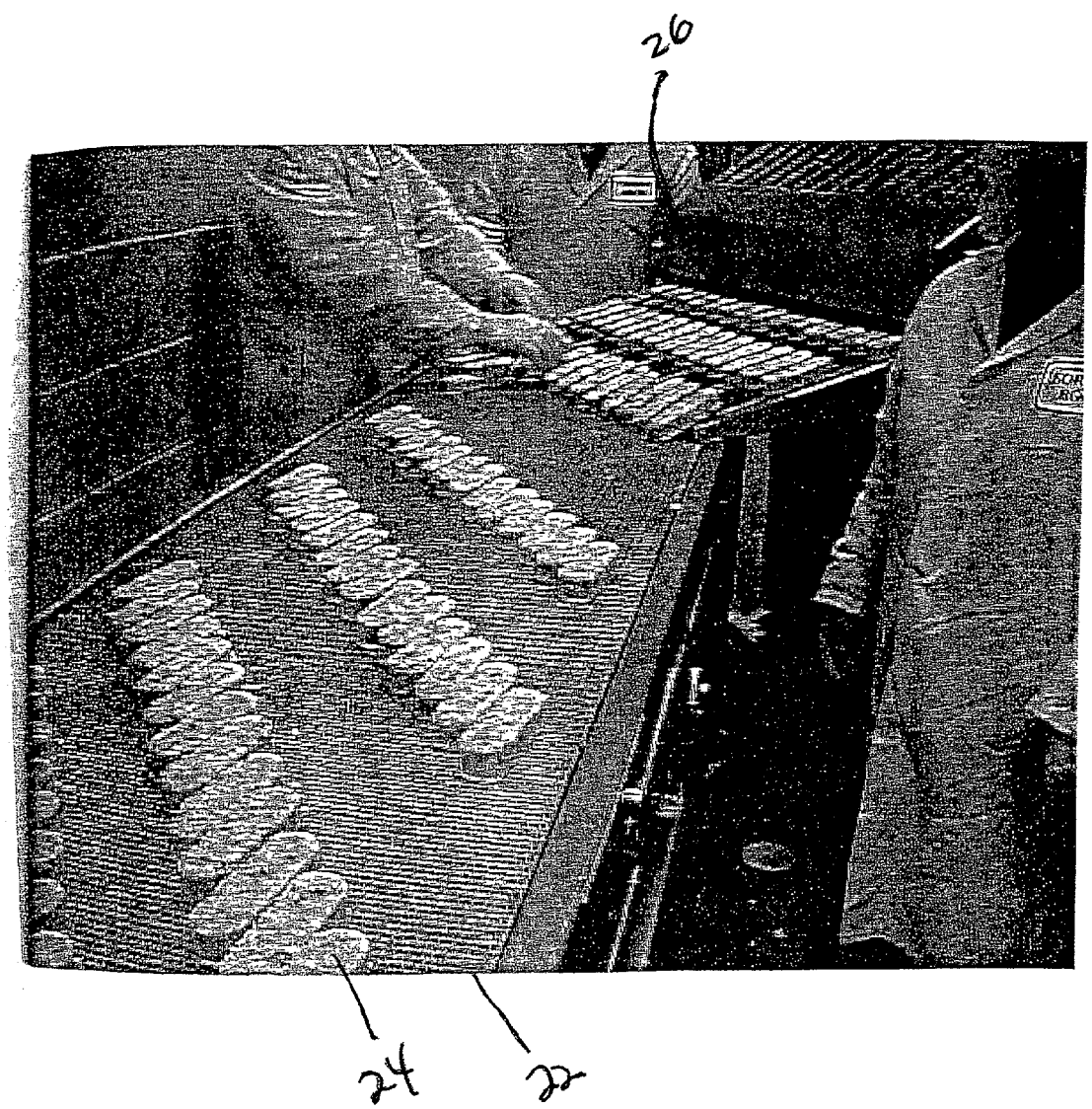
FIG. 8 is an environmental view of a conveyor and consumable food product as it exits the Koppens forming machine and is conveyed to a spiral freezer.

Referring to FIG. 5, the food separation device 14 may be pneumatically operated, air and/or hydraulically operated for the downward positioning of one or a plurality of plungers 16 as aligned with the individual food receiving openings 12. Each plunger 16 is sized to fit within an aligned food receiving opening 12 in order to drive and/or partition a compressed molded consumable food product from the mold 10 for further processing. The food separation device 14 preferably includes a pneumatic, air and/or hydraulic pump having hose conduits 18 connected to a base which in turn are in individual communication with one or a plurality of plungers 16. One or more valves may be utilized to regulate the pneumatic, air and/or hydraulic pressure on the individual plungers 16 for retraction of the plungers 16 to an initial at rest position prior to use to expel the compressed, molded consumable food article from the mold 10.

Generally, the separation device 14 is positioned above a slide and/or rack assembly which is utilized to position a mold 10 having at least one food opening 12 beneath a respective plunger 16. Further, a base plate may be positioned below the mold 10. The base plate may be removed and/or the mold 10 may be positioned in a desired location as separate from the base plate. During the mold filling procedure, the mold 10 is preferably positioned directly over the base and/or backing which functions as a stationary surface during the insertion of the mixed consumable food article into the individual food openings 12. The Auger feature of the Koppens machine is used to move the mixed consumable food product into the individual food openings 12 of the mold 10.

A conveyor 22 is preferably placed below the mold 10. The conveyor 22 receives, carries, and/or transports the compressed and molded consumable food product 24 following separation of the individual consumable food products from the individual food openings 12 as processed by the plunger 16.

The individual items of consumable food product 24 may be individually quick-frozen and then packaged. Alternatively, the individual items of consumable food product 24 may first be packaged and then individually quick-frozen. Further, the individual items of consumable food product 24 may be refrigerated, stored, and/or reheated for consumption by an individual. The molding procedure described herein facilitates the formation of uniform, consistent, and convenient to use individual items of food 24 for reheating and service to an individual. In addition, the procedures identified herein enable individual items of consumable food product 24 to be held frozen, refrigerated and/or hot for extended periods of time without loss of product integrity.

The process for formation of the consumable food product initiates upon the retrieval of a desired volume of individual previously quick frozen ingredients, which have been frozen according to the procedures identified herein with respect to temperature control and freezing times. The selected individually quick frozen ingredients are then thawed in refrigeration for a specific time depending on the ingredients to achieve the desired temperature of 32° F. to 38° F. Some of the individually quick frozen ingredients may stay frozen to maximize the integrity of the product depending on the specific formulation as long as the temperature of the mix does not drop below the 32° F.

After thawing, the initial ingredients are weighed out according to formulation and are placed into a mixing bowl where the temperature of the ingredients should have a range of 32° F. to 38° F. Next, the additional ingredients are added to the mixing bowl in the correct weight as per formulation. A common mixing bowl would be a Hobart 10 quart mixing bowl. Next, the mixer is then activated on speed level two to mix the ingredients within the mixing bowl for a period of time between 45 seconds and 1½ minutes depending of specific formulation. The temperature of the mixed ingredients should range between 32° F. to 38° F. prior to formation in the preformed filling unit to maximize product integrity.

The mixed consumable food product may then be transferred to a kitchen cart and dumped into a hopper which is in part of the dispensing device 26. The mixed consumable food product is then moved with a auger and/or belt as part of the dispensing device 26. A mold 10 having individual food receiving openings 12 is then inserted proximate to the dispensing device 26 where each individual food opening 12 receives a desired amount of consumable food product.

The temperature of the ingredients within the mold 10 is verified to not exceed 38° F. The mold 10 including the consumable food product may then be transported for positioning proximate to or below a separation device 14. The individual plungers 16 may then partition the individual units of consumable food product from the mold 10 and preferably onto the conveyor 22. The specific freezing time will depend on the specific weight and size of the individual units but should not exceed 30 minutes. The temperature of the pre-formed individual egg logs 24 following 30 minutes or less of freezing should be between 10° F. to 20° F. The frozen pre-formed egg logs 24 may then be packaged in poly-lined bags and stored in a freezer for future transportation, delivery, reheating, and consumption by an individual.

In general, the process for formulation of the scrambled egg portion of the enhanced consumable food product includes obtaining a desired amount or volume of unshelled liquid whole eggs acquired by conventional shelling techniques and placing the unshelled liquid eggs in a mixing tank or vessel. The liquid whole eggs may then be mixed for the provision of scrambled liquid eggs. Additional ingredients including, but not necessarily limited to, water, milk, oils, gums and emulsifiers, non-fat dry milk, whey, salt, and spices may then be mixed into the liquid scrambled eggs to create the desired scrambled egg product. The scrambled liquid egg product may then be pumped for preheating within a heat exchanger.

In addition, the preheating procedure for the liquid scrambled egg product may continue through the use of a scraped surface heat exchanger, which may be identified as the Contherm Swept Surface Heat Exchanger. It should be noted that the preheating may be eliminated and/or significantly reduced so long as cooking times and temperatures are correspondingly adjusted for cooking of the scrambled liquid eggs to avoid burning, sticking, and/or other undesirable complications associated with the cooking process where the starting scrambled liquid egg product has not been previously preheated.

It should also be noted that homogenizing of the scrambled liquid egg product may also be utilized provided that the homogenizing methods do not significantly delay the continued cooking of the scrambled liquid egg product. Preferably, the scrambled liquid egg product is cooked within 6 hours of mixing and more preferably cooking occurs immediately following the scrambling of the liquid egg product.

The preheated scrambled liquid egg product may then be cooked in several manners which include, but are not necessarily limited to; a continuous belt grill, a continuous mold oven, and a continuous tube and tube heat exchanger to achieve the specific texture for the eggs as desired for combination with other ingredients included in the consumable food article. Next, the scrambled egg may be chilled or frozen to be used as an ingredient in the pre-formed filling unit described herein. The chilled or frozen scrambled eggs are then mixed with other ingredients desired per formulation and processing described herein. Finally, consumption and/or incorporation of the mixed food product into a food article such as a breakfast burrito, wrap, stuffed potato, and/or frittata may occur.

In general, the ingredients of the consumable food article are not required to be combined in any preferred order for mixing. The ingredients for the consumable food article are preferably mixed cold at a temperature between 15° F. to 38° F. The mixing time normally is reduced to a minimum and generally is no longer than necessary to insure adequate mixing of the product. The time duration of mixing described herein for mixing is generally between 45 seconds and 1½ minutes of mix time per batch. The mixing may occur through the use of several different types of ribbon blenders. One type of ribbon blender is a Krämer & Grebe Multimix Mixer as commercially available.

EXAMPLES

Example I

The first example occcurs at the bench level, where 4,970 grams of previously cooked individually quick frozen scrambled eggs were utilized in combination with 507.5 grams of ham; 507.5 grams of individually quick frozen onions; 350 grams of individually quick frozen green peppers; 350 grams of individually quick frozen red peppers; 175 grams of modified food starch; and 140 grams of spice blend which were utilized to form a western style egg log. The previously cooked and individually quick frozen scrambled eggs comprised 71% of the western style egg log. The pasteurized ham formed 7.25% of the western style egg log. The individually quick frozen onions formed 7.25% of the western style egg log. The individually quick frozen green peppers formed 5% of the western style egg log. The individually quick frozen red peppers formed 5% of the western style egg log. The modified food starch formed 2.5% of the western style egg log. Finally, the spice blend formed 2% of the western style egg log.

Initially, all of the ingredients were withdrawn from the freezer for thawing in a refrigerator overnight with the exception of one half of the individually quick frozen scrambled eggs. The ingredients were maintained overnight at a temperature such that the ingredients had a temperature of 32° F. or 0° C. or greater at the time of mixing not to exceed 38° F. The thawed scrambled eggs, thawed pasteurized ham, thawed onions, thawed red and green peppers were then placed into a Hobart 10 quart mixing bowl. Next, the frozen scrambled eggs were added to the Hobart mixing bowl. The Hobart mixing bowl was then engaged for mixing on speed 2 for 1 minute of time. Next, the starch and spice blend were sprinkled into the mixture. Mixing then occurred for an additional 1 minute of time on speed two. The temperature of the consumable food product following this one minute of mixture should range between 15° F. and 38° F. The mixture was then mixed for an additional 30 seconds. Next, 3.05 ounces or 86.47 grams of mixed consumable food product were weighed and utilized for placement into a homemade pressed mold FIG. #1. The temperature was continued to be monitored so that the temperature did not exceed 38° F. The pre-formed egg logs were then placed into a pre-chilled freezer at a temperature of between −10° F. to 10° F. Following approximately 30 minutes or less within the freezer, the pre-formed egg logs were checked where the product was frozen at between 10° F. to 20° F. −12.22° C. to −6.67° C.

As noted the amount of mixing and the temperature within each stage of mixing has an impact upon the integrity of the egg and other ingredients.

The above-identified ingredients, temperature, and processing procedures resulted in an enhanced consumable food product having improved color, texture, mouth feel, and over all appearance as compared to consumable food products including eggs not formulated according to the above-identified specifications.

Example II

In this example: 177.5 lbs. or 80.51 kilograms of individually quick frozen scrambled eggs were utilized in combination with 177.5 lbs. or 50.51 kilograms of tempered scrambled eggs; 36.25 lbs. or 16.44 kilograms of tempered ham; 36.25 lbs. or 16.44 kilograms of tempered onions; 25 lbs. or 11.34 kilograms of tempered green peppers; and 25 lbs. 11.34 kilograms of tempered red peppers were utilized to form a western style egg log. The individually quick frozen cooked scrambled eggs constituted 71% of the western style egg log; ham constituted 7.25% of the western style egg log; onions constituted 7.25% of the western style egg log; green peppers constituted 5% of the western style egg log; red peppers constituted 5% of the western style egg log; modified food starch constituted 2.5% of the western style egg log; and spice pack blend constituted 2% of the western style egg log.

One half of the scrambled eggs, all of the onions, red peppers, and green peppers were placed in a cooler for 24 hours to temper at a temperature in the cooler between 34° F. and 37° F. or 1.11° C. to 2.78° C. After tempering the temperature of the scrambled eggs, onions, red peppers, and green peppers was between 32° F. and 38° F. or 0° C. to 3.33° C.

Next, 177.5 lbs. or 80.51 kilograms of individually quick frozen scrambled eggs while still frozen were then placed into a mixer along with 177.5 lbs. or 80.51 kilograms of the tempered scrambled eggs; 36.25 lbs. or 16.44 kilograms of the tempered ham; 36.25 lbs. or 16.44 kilograms of the tempered onions; 25 lbs. or 11.34 kilograms of the tempered green peppers; and 25 lbs. or 11.34 kilograms of the tempered red peppers. Mixing of the ingredients then occurred for 30 seconds in one direction. Next, 12.5 lbs. or 5.67 kilograms of UltraTex 4 Starch and 10 lbs. or 4.54 kilograms of spice pack blend was sprinkled over the top of the mixture. Mixing then occurred for 120 seconds by mixing alternatively for a time period of 30 seconds within each direction relative to forwards and backwards. The temperature of the mixture following the mixing for 120 seconds was 29° F. to 38° F.

Next 250 lbs. or 113.40 kilograms of mixed consumable food product were transferred into a forming machine. The forming machine then dispensed approximately 100 lbs. or 45.36 kilograms leaving approximately 150 lbs. or 68.04 kilograms remaining in the forming machine. The remaining 250 lbs. or 113.40 kilograms of mixed consumable food product were then added to the forming machine whereupon the forming machine was operated for consecutive runs of approximately 125 lbs. or 56.67 kilograms each. The forming machine placed the products into individual molds 10, which were then processed within a separation device for the formulation of the consumable food product into a western style egg log. A conveyor 22 immediately transferred the formed western style egg logs into a freezer. An internal target temperature of −10° F. or −23.33° C. was utilized with a maximum internal temperature of 20° F.

A Spiral freezer was utilized for freezing purposes. The western style egg log formed according to this process exhibits superior taste and texture following reheating for consumption following freezing.

Mixing time may be reduced to 90 seconds if all of the ingredients with the exception of the eggs were mixed at once. Thawing may require a duration of time in excess of 24 hours to achieve the desired 32° F. to 38° F. temperature range.

Example III

In another bench top example, 2,147.11 grams of individually quick frozen scrambled eggs were utilized in combination with 562.4 grams of pasteurized ham; 148 grams of American cheese; 148 grams of Pepper Jack cheese; 148 grams of Cheddar cheese; 111 grams of individually quick frozen onions; 74 grams of individually quick frozen green chilies; 111 grams of water; 74 grams of individually quick frozen green peppers; 74 grams of individually quick frozen red peppers; 74 grams of modified food starch; 18.5 grams of salt; 9.25 grams of white pepper; and 0.74 grams of chili flavor were utilized to form breakfast burrito filling.

The individually quick frozen cooked scrambled eggs constituted 58% of the burrito filling; ham constituted 15.2% of the burrito filling; American Cheese constituted 4% of the burrito filling; Pepper Jack cheese constituted 4% of the burrito filling; Cheddar cheese constituted 4% of the burrito filling; onions constituted 3% of the burrito filling; green chilies constituted 2% of the burrito filling; water constituted 3% of the burrito filling; green peppers constituted 2% of the burrito filling; red pepper constituted 2% of the burrito filling; modified food starch constituted 2% of the burrito filling; salt constituted 0.5% of the burrito filling; white pepper constituted 0.25% of the burrito filling; and chili flavor constituted 0.02% of the burrito filling.

One-half of the individually quick frozen scrambled eggs, all of the ham, all of the onions, all of the green chilies, all of the green peppers, and all of the red peppers were placed in a cooler for 24 hours to temper at a temperature in the cooler between 32° F. to 38° F. After tempering, the temperature of one-half of the individually quick frozen scrambled eggs, ham, onions, green chilies, green peppers, and red peppers was between 32° F. to 38° F. Next, the frozen one-half of the individually quick frozen scrambled eggs while still frozen were placed into a mixer along with the one-half of the thawed individually quick frozen scrambled eggs; the tempered ham; the American cheese; the Pepper Jack cheese; the Cheddar cheese; the onions; the green chilies; the water; the green peppers; and the red peppers. The mixing of the ingredients then occurred for 60 seconds on speed #2 in Hobart 10 quart mixing bowl. Next, modified food starch, salt, white pepper, and chili flavor were sprinkled over the top of the mixture. Mixing then occurred for an additional 30 seconds on speed #1. The temperature of the mixture following the mixing for 90 seconds is preferably between 29° F. and 38° F. prior to forming.

Next, the 3,700 grams of mixed consumable food product was then weighed out to specific weights desired and pressed into homemade mold similar to FIG. 1. The mixture of the consumable food product was continually monitored for a temperature between 29° F. and 38° F. The consumable food product was then pressed into the mold and pushed out into individual portions. When all mixture was used the pre-formed filling units were then placed into a pre-chilled freezer. Having an internal target temperature for the food product of 10° F. to 20° F. A Spiral freezer was utilized for freezing purposes. The individual breakfast burrito fillings formed according to this process exhibited superior taste and texture following reheating for consumption following freezing.

As noted the amount of mixing and the temperature within each stage of mixing has an impact upon the integrity of the egg and other ingredients.

The above-identified ingredients, temperature, and processing procedures resulted in an enhanced consumable food product having improved color, texture, mouth feel, and over all appearance as compared to consumable food products including eggs not formulated according to the above-identified process.

Example IV

In another bench top example, 1,925 grams of cooked individually quick frozen scrambled eggs were utilized in combination with 784.4 grams of cooked individually quick frozen sausage; 148 grams of American cheese; 148 grams of pepper Jack Cheese; 148 grams of Cheddar cheese; 111 grams of onions; 111 grams of water; 74 grams of individually quick frozen green chilies; 74 grams of individually quick frozen green peppers; 74 grams of individually quick frozen red peppers; 74 grams of modified food starch; 18.5 grams of salt; 9.25 grams of white pepper; and 0.74 grams of chili flavor for formulation of individual portions of breakfast burrito filling.

The cooked individually quick frozen scrambled eggs constituted 52.03% of the burrito filling; sausage constituted 21.2% of the burrito filling; American cheese constituted 4% of the burrito filling; Pepper Jack cheese constituted 4% of the burrito filling; Cheddar cheese constituted 4% of the burrito filling; onions constituted 3% of the burrito filling; water constituted 3% of the burrito filling; green chilies constituted 2% of the burrito filling; green peppers constituted 2% of the burrito filling; red pepper constituted 2% of the burrito filling; modified food starch constituted 2% of the burrito filling; salt constituted 0.5% of the burrito filling; white pepper constituted 0.25% of the burrito filling; and chili flavor constituted 0.02% of the burrito filling.

All of the individually quick frozen scrambled eggs, sausage, onions, green chilies, green peppers, and red peppers were placed in a cooler for 24 hours to temper at a temperature in the cooler between 29° F. and 38° F. After tempering, the temperature of the thawed scrambled eggs, sausage, onions, green chilies, green peppers, and red peppers was between 29° F. and 38° F.

Next, all of the pre-weighed ingredients from example IV were placed in Hobart 10 quart mixing bowl and mixed on speed two for 60 seconds. The temperature of the mixture following the mixing for 60 seconds was preferably between 29° F. and 38° F.

Next, the 3,700 grams of mixed consumable food product was then weighed out to specific weights desired and pressed into homemade molds similar to FIG. 1. The mixture of the consumable food product was continually monitored for temperature to range between 29° F. and 38° F. The consumable food product was then pressed into the mold and pushed out into individual portions. When all mixture was used the pre-formed filling units were then placed into a pre-chilled freezer having an internal target temperature for the fod product of between −10° F. and 20° F. A Spiral freezer was utilized for freezing purposes. The individual breakfast burrito fillings formed according to this process exhibited superior taste and texture following reheating for consumption following freezing.

As noted, the amount of mixing and the temperature within each stage of mixing has an impact upon the integrity of the egg and other ingredients.

The above-identified ingredients, temperature, and processing procedures resulted in an enhanced consumable food product having improved color, texture, mouth feel, and over all appearance as compared to consumable food products including eggs not formulated according to the above-identified process.

Example V

In another bench top example, 1,435 grams of individually quick frozen scrambled eggs were utilized in combination with 1,006.25 grams of cooked individually quick frozen sausage crumbles; 665 grams of Cheddar cheese; 140 grams of individually quick frozen green peppers; 140 grams of individually quick frozen red peppers; 70 grams of modified food starch; and 43.75 grams of burrito spice mix for formation of individual breakfast burrito fillings.

The cooked individually quick frozen scrambled eggs constituted 41% of the breakfast burrito filling; the sausage crumbles constituted 28.75% of the breakfast burrito filling; the Cheddar cheese constituted 19% of the breakfast burrito filling; the green peppers constituted 4% of the breakfast burrito filling; the individually quick frozen red peppers constituted 4% of the breakfast burrito filling; the modified food starch constituted 2% of the breakfast burrito filling; and the burrito spice mix constituted 1.25% of the breakfast burrito filling.

All of the individually quick frozen scrambled eggs, sausage, green peppers, and red peppers were placed in a cooler for 24 hours to temper at a temperature in the cooler between 29° F. and 38° F. After tempering, the temperature of the thawed scrambled eggs, sausage, green peppers, and red peppers was between 29° F. and 38° F.

Next, all of the pre-weighed ingredients from example V were placed in a Hobart 10 quart mixing bowl and were mixed on speed #2 for 60 seconds. The temperature of the mixture following the mixing for 60 seconds was between 29° F. and 38° F.

Next, the 3,500 grams of mixed consumable food product was weighed out to specific weights desired and pressed into homemade molds similar to FIG. 1. The mixture of the consumable food product was continually monitored for a temperature between 29° F. and 38° F. The consumable food product was then pressed into the mold and pushed out into individual portions. When all mixture was used the pre-formed filling units were then placed into a pre-chilled freezer having an internal target temperature for the food product of −10° F. to 20° F. A Spiral freezer was utilized for freezing purposes. The individual breakfast burrito fillings formed according to this process exhibited superior taste and texture following reheating for consumption following freezing.

As noted, the amount of mixing and the temperature within each stage of mixing has an impact upon the integrity of the egg and other ingredients.

The above-identified ingredients, temperature, and processing procedures resulted in an enhanced consumable food product having improved color, texture, mouth feel, and over all appearance as compared to consumable food products including eggs not formulated according to the above-identified process.

It should be noted that the process steps identified above may be substantially interchained and modified without sacrifice as to the final consumable food product so long as temperature is regulated and mixing time is controlled to avoid excessive temperatures and over mixing.

In general, the ingredients identified herein have been provided for illustrative purposes and should not be considered as restrictive. In addition, reference herein to modified food starch may generally include a wide variety of commercially available corn starches and/or potato starches used in food products which are FDA approved for consumption by individuals. In addition, certain sugars may be used as substitutes for or in combination with either of the modified food starches identified herein. Further, reference herein to soy oil and/or corn oil may include reference to other edible oils namely peanut oil, and vegetable oils. It should also be noted that a number of alternative edible oils may adequately function as substitute ingredients for the identified soy bean oil and/or corn oil herein.

Carboxymethylcellulose, carrageenan, guar gums, locust bean gum, beta carotene, agar, glycerol mono stearate, mono diglycerides and polypropylene glycol esters may function as acceptable substitutes and/or replacements for the xanthan gum and the gums and emulsifiers herein. Further, other milk products may be substituted for the non-fat dry milk and whey as used herein for incorporation into the consumable food product including eggs.

It should be noted that the percentage weights provided herein have been rounded mathematically which in certain instances may not exactly equal 100%. In these instances, the percentage of eggs and/or water may be insignificantly increased or decreased to provide a 100% summation.

The above examples and disclosure are intended to be illustrative and not exhaustive. These examples and description will suggest many variations and alternatives to one of ordinary skill in the art. All of these alternatives and variations are intended to be included within the scope of the attached claims. Those familiar with the art may recognize other equivalents to the specific embodiments described herein which equivalents are also intended to be encompassed by the claims attached hereto.

The present invention may be embodied in other specific forms without departing from the spirit or essential attributes thereof; therefore, the illustrative embodiments should be considered in all respects as illustrative and not restrictive, reference being made to dependent claims rather than to the foregoing description to indicate the scope of the invention.

While this invention may be embodied in many different forms, there are described in detail herein specific preferred embodiments of the invention. This description is an exemplification of the principles of the invention and is not intended to limit the invention to the particular embodiments illustrated.

For the purposes of this disclosure, like reference numerals in the figures shall refer to like features unless otherwise indicated.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below (e.g. claim 3 may be taken as alternatively dependent from claim 2; claim 4 may be taken as alternatively dependent on claim 2, or on claim 3; claim 6 may be taken as alternatively dependent from claim 5; etc.).

This completes the description of the preferred and alternate embodiments of the invention. Those skilled in the art may recognize other equivalents to the specific embodiment described herein which equivalents are intended to be encompassed by the claims attached hereto.

The invention claimed is:

1. A consumable food article comprising: a) cooked individually quick frozen scrambled eggs wherein said cooked individually quick frozen scrambled eggs form between 66% and 76% by weight of said consumable food article; b) ham wherein said ham forms between 6.75 to 7.75% by weight of said consumable food article; c) individually quick frozen onions, wherein said individually quick frozen onions form between 6.75% to 7.75% by weight of said consumable food article; d) individually quick frozen green peppers, wherein said individually quick frozen green peppers form between 3% an 7% by weight of said consumable food article; e) individually quick frozen red peppers, wherein said individually quick frozen red peppers form between 3% and 7% by weight of said consumable food article; f) modified food starch, wherein said modified foods starch forms between 2% and 3% by weight of said consumable food article; and g) spice blend wherein said spice blend forms between 1.5% and 2.5% by weight of said consumable food article, wherein said mixed cooked individually quick frozen scrambled eggs, said ham, said individually quick frozen onions, said individually quick frozen green peppers, said individually quick frozen red peppers, said modified food starch, and said spice blend are molded into pre-formed filling units.

2. The consumable food article according to claim 1, wherein said cooked individually quick frozen scrambled eggs, said ham, said individually quick frozen onions, said individually quick frozen green peppers, said individually quick frozen red peppers, said modified food starch, and said spice blend are mixed at a temperature not to exceed 38 F.

3. The consumable food article according to claim 2, wherein said cooked individually quick frozen scrambled eggs, said ham, said individually quick frozen onions, said individually quick frozen green peppers, said individually quick frozen red peppers, said modified food starch, and said spice blend are mixed for a period of time not to exceed 90 seconds.

4. The consumable food article according to claim 1, wherein said pre-formed filling units are frozen at a temperature between −10 degree F. and 20 degree F.

5. A consumable food article comprising: a) cooked individually quick frozen scrambled eggs, wherein said cooked individually quick frozen scrambled eggs form between 66% and 76% by weight of said consumable food article; b) ham, wherein said ham forms between 6.75% and 7.75% by weight of said consumable food article; c) individually quick frozen onions, wherein said individually quick frozen onions form between 6.75% and 7.75% by weight of said consumable food article; d) individually quick frozen green peppers, wherein said individually quick frozen green peppers form between 4% and 6% by weight of said consumable food article; e) individually quick frozen red peppers, wherein said individually quick frozen red peppers form between 4% and 6% by weight of said consumable food article; f) modified food starch, wherein said modified food starch forms between 0.01% and 5% by weight of said consumable food article: and g) spice pack blend, wherein said spice pack blend forms between 0.01% and 4% by weight of said consumable food article, wherein said mixed cooked individually quick frozen scrambled eggs, said ham, said individually quick frozen onions, said individually quick frozen green peppers, said individually quick frozen red peppers, said modified food starch, and said spice blend are molded into egg logs.

6. The consumable food article according to claim 5, wherein said cooked individually quick frozen scrambled eggs, said ham, said individually quick frozen onions, said individually quick frozen green peppers, said individually quick frozen red peppers, said modified food starch, and said spice blend are mixed at a temperature not to exceed 38 degree F.

7. The consumable food article according to claim 6, wherein said cooked individually quick frozen scrambled eggs, said ham, said individually quick frozen onions, said individually quick frozen green peppers, said individually quick frozen red peppers, said modified food starch, and said spice blend are mixed for an initial period of 1 minute, then are mixed for a period of time not to exceed 90 seconds.

8. The consumable food article according to claim 5, wherein said egg logs are frozen at a temperature between −10 degree F. and 20 degree F.

9. A consumable food article comprising:
a) cooked individually quick frozen scrambled eggs wherein said cooked individually quick frozen scrambled eggs form between 40% and 91% by weight of said consumable food article; and
b) individually quick frozen food ingredients mixed in with the eggs, the food ingredients being selected from the group consisting of meat, cheese, peppers, and combinations thereof, the cooked individually quick frozen scrambled eggs and the cooked individually quick frozen food ingredients being molded into preformed filling units.

10. The consumable food article of claim 9, in which the pepper is selected from the group consisting of green peppers and red peppers and combinations thereof, in which the green and red peppers have not been cooked with the eggs.

11. The consumable food article of claim 9, in which the meat is selected from the group consisting of ham, sausage, bacon, and combinations thereof, and in which the meat has not been cooked with the eggs.

12. The consumable food article of claim 9, in which the meat is precooked.

13. The consumable food article of claim 9, in which the cheese is selected from the group consisting of American cheese, pepper jack cheese, cheddar cheese, and combinations thereof, and wherein the cheese has not been cooked with the eggs.

14. The consumable food article of claim 9, in which the food ingredients include individually quick frozen green pepper and in which the green pepper has not been cooked with the eggs.

15. The consumable food article of claim 9, in which the food ingredients include individually quick frozen red pepper and in which the red pepper has not been cooked with the eggs.

16. The consumable food article of claim 9, in which the food ingredients further include individually quick frozen onion mixed in with the eggs, and wherein the onion has not been cooked with the eggs.

17. The consumable food article of claim 9, further comprising a tortilla shell wrapped around the eggs and the food ingredients.

18. The consumable food article of claim 9, including ham present between 0 and 30 weight percent.

19. The consumable food article of claim 9, including onion present between 0 and 10 weight percent.

20. The consumable food article of claim 9, including sausage present between 0 and 30 weight percent.

21. The consumable food article of claim 9, including green pepper present between 0 and 6 weight percent.

22. The consumable food article of claim 9, including red pepper present between 0 and 6 weight percent.

23. The consumable food article of claim 9, in which the article has a log shape.

24. The consumable food article of claim 9, in which the article has a round shape.

25. The consumable food article of claim 9, in which the article has a rectangular shape.

26. The consumable food article of claim 9, in which the article has a rectangular shape with rounded ends.

27. The consumable food article of claim 9, in which the food ingredients and eggs were mixed at a temperature of not greater than 38 degrees F.

28. A consumable food article produced according to the method comprising:
a) cooking scrambled eggs;
b) individually quick freezing the scrambled eggs;
c) individually quick freezing food ingredients, the food ingredients being selected from the group consisting of meat, cheese, peppers, and combinations thereof
d) mixing the food ingredients and the scrambled eggs; and
e) freezing the mixture.

29. The consumable food article according to claim 28 further comprising forming the mixture into preformed-filling units prior to freezing.

* * * * *